Nov. 21, 1967   J. R. H. BONNEFOY   3,354,332
FLAT ANNULAR AIRGAP ELECTRIC ROTARY MACHINES
Filed Aug. 6, 1963

Inventor
Jean R. H. Bonnefoy
By Kenyon, Palmer, Stewart & Estabrook
attorneys

United States Patent Office 3,354,332
Patented Nov. 21, 1967

3,354,332
FLAT ANNULAR AIRGAP ELECTRIC ROTARY MACHINES
Jean Roger Henri Bonnefoy, Montrouge, France, assignor to Printed Motors Inc., New York, N.Y.
Filed Aug. 6, 1963, Ser. No. 300,286
Claims priority, application France, Sept. 11, 1962, 909,192
8 Claims. (Cl. 310—268)

The present invention concerns improvements in or relating to flat annular airgap electric rotary machines wherein a rotating armature is made of a winding comprising flat and thin conductors intimately bonded to the face or faces of a thin insulating annular carrier, as being for instance "printed" on said carrier. As it is known, a printed circuit is a circuit formed by any technique for repeatedly reproducing a pattern of electrical conductors on a surface.

In such machines, wherein the stator part includes at least one ring of magnetic poles as a field member thereof, the magnetic airgap must preferably be quite narrow and just housing the thin rotating armature. A difficulty lies in the insufficiency of strength of the armature which may not be such as to stand up under undue mechanical deformations which may result in deterioration during the useful life of the machine.

It is the object of the invention to substantially eliminate such a difficulty while preserving a thin armature rotating within a very narrow magnetic airgap.

According to the invention, the armature in such a machine is supported by its outer periphery in a supporting member which applies a strong and substantially uniformly distributed radial stretch to the annulus defined by the winding and its insulating carrier.

For explaining the invention in more detail, reference is made to the accompanying drawings, wherein.

Figure 2:
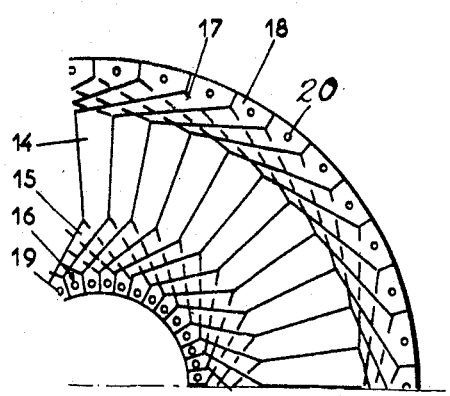
FIG. 2 shows a partial view of one possible pattern of the armature winding.
Figures 3, 4:
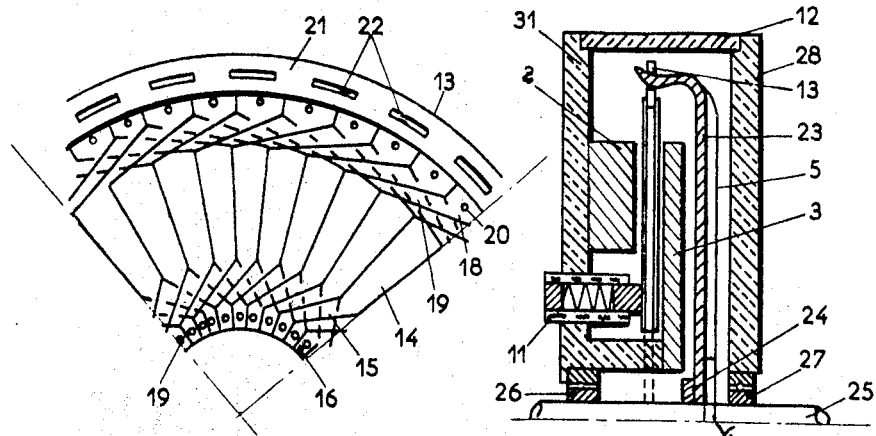
FIG. 3 shows a partial modification of the embodiment of FIG. 2.
FIG. 4 shows a half cross-section view of the modified embodiment of FIGURE 3; and, FIG. 5 shows in an elevation half section view, another embodiment according to the invention.

The armature winding 1 is made, as said, by printed conductors on a thin insulating carrier and, as a mere illustration, its pattern may be as shown on FIGS. 2 and 3. It is a series-wave winding for a machine having eight poles and with forty-one conductors per face. Each conductor comprises a substantially radial mid-portion 14 extending on both sides by slanted portions 15 and 17 (which may be curved if desired) ending in terminals 16 and 18 respectively for face-to-face connections by means, for instance, of metallized holes 19 and 20. From one face to the other one, the slants of the portions 15 and 17 are reversed as indicated in dot lines so that the through connections 19 and 20 close the winding pattern. Any variation of such a pattern can be contemplated without departing from the scope of the invention; what is important is that the winding proper is made of thin conductors secured or bonded to a thin carrier, so that the armature disc is itself quite thin and of mechanical strength not sufficient per se for avoiding undue deformations during its use.

Usually, such an armature is secured to the shaft of the machine by its inner center portion. In contradistinction thereto, the present invention provides an intermediate carrier 4 serving as a coupling member between the armature and the hub 6 on the shaft 7 (FIG. 1) or 23 (FIG. 4) and said carrier is made so that it exerts a peripheral stretch of substantially uniform distribution on the armature. Such stretching of the armature annulus avoids any possibility of deformation of the armature when it rotates and consequently avoids deterioration thereof. This carrier is resiliently made and provided with tabs or hooks cut in an edge of a cup-shaped plate 4 (FIG. 1) or 23 (FIG. 4). This plate is secured by its inner edge to the hub 6. It does not have to be thick and may be sufficiently strengthened by such fins as 5, radially distributed for instance around the disc part of said plate, so that the mechanical inertia of the rotating part of the machine is not appreciably increased.

Figure 1:
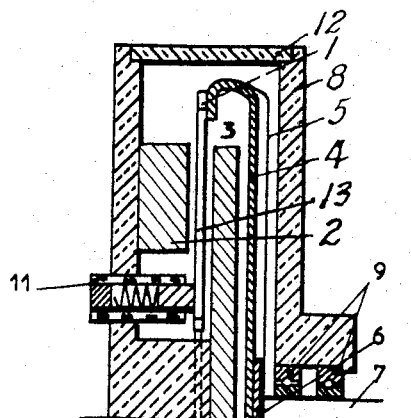
FIG. 1 shows a half cross-section elevation view of a first embodiment of the invention.

The securing of the tabs to the armature disc 1 can be provided by gluing the external edge portion of the disc on said tabs, FIGS. 1 and 2, or the carrier 13 of the armature winding may be cut with slots 22 in its edge portion 21 so that the hooks penetrate them, FIG. 4. Such a bare portion of carrier 13 may be provided if required for the gluing of FIG. 1. In both cases, the tabs and hooks are resilient and somewhat slightly cambered or bent in order to increase the final mechanical stretch.

This means of attaching the armature to the hub would drastically increase the magnetic airgap if it were not also arranged to insert a magnetic annulus 3 between the armature disc and the disc-part of the plate 4. Such insertion is made prior the securing of the armature and its support on the hub. The magnetic annulus 3 is thereafter secured to the member of the housing which also serves as a carrier for the permanent magnets 2 which must be understood, as said, as forming a ring of magnets coaxially the axis of the shaft, and for the brushes such as 11. Instead of separate pole protruding magnets 2, there may be substituted a ring having a coercive ferrite material of planar surface facing towards the airgap and in which are formed permanent magnetic poles. In a modification, the magnetic annulus 3 may be mounted so as to be freely rotatable on the shaft, when said shaft passes through the armature part of the machine. Such a freely rotatable mounting of a magnetic annulus is disclosed in copending application No. 300,288 filed Aug. 6, 1963.

The mechanical mounting of the machine can then be completed either, as shown in FIG. 1, by mounting the shaft 7 within ball-bearings 9 supported in a plate 8 affixed by struts 12 to the rear plate supporting the magnets, or, as shown in FIG. 4, by mounting the shaft 25 in bearings 26 and 27 carried by plates 31 and 28 secured by struts 12. In the arrangement of FIG. 4, the supporting plate 23 of the armature is secured to the hub 6 by means of a screw or securing ring 24.

Figure 5:
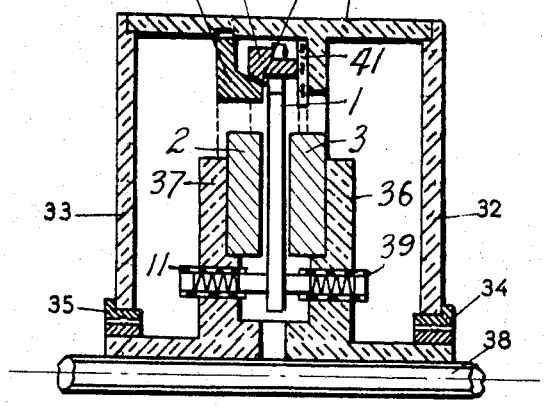

Referring now to FIG. 5, when the armature winding must be supported on a cage such as 31 rotating around a fixed axle 38 through bearings 34 and 35 to which the cage is linked by struts such as 32 and 33, the armature disc can still be stretched by its peripherical edge. The armature disc 1 is of the kind shown in FIG. 3, with holes through an edge portion of the winding carrier. A rigid ring 40 is provided with tabs passing through said holes and abutting on a ring 41 secured, for instance glued, on an internal shoulder of the cage. The ring 40 presents a trunconical surface coaxial with the axis of the machine and a conical annulus 42 can be screwed within the cage 31 to pressing a conical joint 43 against the conical inner surface of the ring 40. Consequently a radial stretch is applied to the armature member 1 as the tabs 41 are raised as the annulus 42 is screwed. The tab ends may penetrate into the ring 41 in order to supply an additional fixation of the armature to the cage in addition to the one provided by the conical arrangement of rings. As a modification from FIG. 1, the armature disc in FIG. 5 can be glued to the ring 40 instead of being secured to said ring by a hole and tab arrangement. The magnetic circuit of FIG. 5 is made of rings 2 and 3 one at least of them having magnetic poles. Said rings are affixed in circular flanges of sleeves passed around the axle 38. In said flanges 37 and 36 may be mounted brushes such as 11 and abutments such as 39, both brushes and abutments being resiliently made and preferably bearing against the inner edge portion of the armature.

In the embodiment of FIGURES 1 and 4 the shafts 7 and 25 constitute the rotating output members while in FIGURE 5 the shaft 38 is stationary and the cage 31, 32 is the rotating output member.

What is claimed is:
1. An electric motor of the type having a thin annular disk rotor and a rotating output member and in which the rotor rotates on the same axis as the output member, coupling means for connecting the outer periphery of said rotor to said output member and for placing said rotor under substantially uniform radial tension.

2. A motor as defined by claim 1 in which said coupling means constitutes the sole connection between said rotor and said output member.

3. In a flat annular air gap electrical rotary machine having an output shaft, a rotor comprising:
a thin annular disk of insulating material having flat radially-disposed conductors on at least one face thereof, said disk surrounding said shaft;
and a cup-shaped member at least the outer peripheral position of which is resilient, secured at its center to said shaft and having its outer peripheral portion attached to the outer periphery of said disk while in radial compression in order to place said disk in substantially uniform radial tension.

4. A rotary electric machine comprising in combination:
a stator member having an annular-arranged series of magnetic poles and an annulus of magnetic material spaced axially therefrom to define a flat annular air gap;
an output shaft concentrically disposed with respect to said annulus;
a rotor member including a thin flat annular disk of insulating material having flat radially-disposed conductors on and intimately bonded to opposite faces thereof, said rotor being positioned within said annular air gap;
a cup-shaped member at least the outer periphery of which is resilient, attached at its center to said shaft and positioned on the opposite side of said annulus from said rotor, the outer periphery of said member being attached to the outer periphery of said rotor while under radial compression so as to place said rotor under a continuous and substantially uniform radial tension.

5. The combination defined by claim 1 including a stationary shaft and in which said output member comprises a cage surrounding said rotor and mounted for rotation about said shaft.

6. The combination defined by claim 1 in which said coupling means is glued to the outer periphery of said rotor.

7. An electric motor as defined by claim 1 in which said rotor includes a series of openings in the outer periphery thereof and in which said coupling means includes tab members extending through said openings.

8. The combination defined by claim 5 in which said coupling means comprises a first annular member secured to the outer edge of said rotor and having a conical surface and a second annular member having a mating conical surface engaging with the conical surface of said first member and means carried by said cage for varying the axial distance between said annular members in order to place said rotor under substantially uniform radial tension.

References Cited
UNITED STATES PATENTS

| | | | |
|---|---|---|---|
| 447,921 | 3/1891 | Tesla | 310—268 X |
| 24,278 | 10/1910 | Evershed | 181—31 |
| 1,605,796 | 11/1926 | Tanzler | 310—268 X |
| 1,827,283 | 10/1931 | Forest | 181—31 |
| 1,857,794 | 5/1932 | Smythe | 181—31 |
| 2,095,247 | 10/1937 | Griffith | 181—24 |
| 2,770,681 | 11/1956 | Perry | 179—115 X |
| 3,168,664 | 2/1965 | Bost | 310—268 |
| 3,169,204 | 2/1965 | Moressee | 310—268 |

FOREIGN PATENTS

| | | |
|---|---|---|
| 1,311,315 | 10/1962 | France. |
| 24,278 | 10/1910 | Great Britain. |

MILTON O. HIRSHFIELD, *Primary Examiner.*

J. J. SWARTZ, J. W. GIBBS, *Assistant Examiners.*